(12) United States Patent
Yin (10) Patent No.: US 10,382,286 B2
(45) Date of Patent: Aug. 13, 2019

(54) INFORMATION PROCESSING METHOD IN M2M AND APPARATUS

(71) Applicant: Huawei Technologies Co., Ltd., Shenzhen (CN)

(72) Inventor: Jiaxin Yin, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 15/245,283

(22) Filed: Aug. 24, 2016

(65) Prior Publication Data

US 2016/0366028 A1 Dec. 15, 2016

Related U.S. Application Data

(63) Continuation of application No. PCT/CN2014/072468, filed on Feb. 24, 2014.

(51) Int. Cl.
*H04L 12/24* (2006.01)
*H04W 4/70* (2018.01)
(Continued)

(52) U.S. Cl.
CPC .............. *H04L 41/20* (2013.01); *H04L 29/06* (2013.01); *H04L 41/00* (2013.01);
(Continued)

(58) Field of Classification Search
CPC ......... H04L 29/06; H04L 41/00; H04L 41/20; H04L 67/1074; H04L 67/12;
(Continued)

(56) References Cited

U.S. PATENT DOCUMENTS

2006/0046711 A1 3/2006 Jung et al.
2006/0092859 A1* 5/2006 Choi ................. H04L 29/12018
370/254
(Continued)

FOREIGN PATENT DOCUMENTS

CN 102111288 A 6/2011
CN 103546983 A 1/2014
(Continued)

OTHER PUBLICATIONS

Machine Translation and Abstract of Japanese Publication No. JP2008011516, Jan. 17, 2008, 14 pages.
(Continued)

*Primary Examiner* — Stephen J Clawson
(74) *Attorney, Agent, or Firm* — Conley Rose, P.C.

(57) ABSTRACT

The present disclosure provides an information aggregation method in machine-to-machine communication (M2M), and an apparatus, where the method includes receiving an aggregation resource creation request, determining an identifier of an aggregated resource and an aggregation manner according to the aggregation resource creation request, creating an aggregation resource according to the determined identifier of the aggregated resource and the determined aggregation manner, where an attribute of the aggregation resource includes the identifier of the aggregated resource and the aggregation manner, and performing information aggregation according to the created aggregation resource.

20 Claims, 4 Drawing Sheets

(51) Int. Cl.
*H04W 4/60* (2018.01)
*H04L 29/06* (2006.01)
*H04L 29/08* (2006.01)

(52) U.S. Cl.
CPC .......... *H04L 67/1074* (2013.01); *H04L 67/12* (2013.01); *H04L 67/2833* (2013.01); *H04W 4/60* (2018.02); *H04W 4/70* (2018.02)

(58) Field of Classification Search
CPC .. H04L 67/2833; H04W 4/003; H04W 4/005; H04W 4/60; H04W 4/70
USPC .......................................................... 370/252
See application file for complete search history.

(56) References Cited

U.S. PATENT DOCUMENTS

| | | | |
|---|---|---|---|
| 2010/0177735 A1* | 7/2010 | Bihannic | H04N 21/2381 370/331 |
| 2011/0234427 A1 | 9/2011 | Ingram et al. | |
| 2012/0102222 A1* | 4/2012 | Mao | H04W 4/70 709/238 |
| 2012/0310599 A1 | 12/2012 | Tanaka et al. | |
| 2013/0246519 A1* | 9/2013 | Foti | H04W 4/08 709/204 |
| 2013/0267267 A1* | 10/2013 | Mujtaba | H04W 36/0066 455/509 |
| 2013/0332603 A1 | 12/2013 | Hutten | |
| 2014/0280581 A1* | 9/2014 | Hernandez | H04L 29/08072 709/204 |
| 2014/0325042 A1* | 10/2014 | Croy | H04L 41/082 709/221 |

FOREIGN PATENT DOCUMENTS

| | | |
|---|---|---|
| EP | 2541834 A1 | 1/2013 |
| JP | 2008011516 A | 1/2008 |
| WO | 2012154198 A1 | 11/2012 |

OTHER PUBLICATIONS

Foreign Communication From a Counterpart Application, Japanese Application No. 2016-570153, Japanese Office Action dated Sep. 5, 2017, 3 pages.
Foreign Communication From a Counterpart Application, Japanese Application No. 2016-570153, English Translation of Japanese Office Action dated Sep. 5, 2017, 3 pages.
Foreign Communication From a Counterpart Application, European Application No. 14883252.0, Extended European Search Report dated Feb. 20, 2017, 8 pages.
Foreign Communication From a Counterpart Application, International Application No. PCT/CN2014/072468, English Translation of International Search Report dated Nov. 26, 2014, 2 pages.
Foreign Communication From a Counterpart Application, International Application No. PCT/CN2014/072468, English Translation of Written Opinion dated Nov. 26, 2014, 7 pages.

* cited by examiner

INFORMATION PROCESSING METHOD IN M2M AND APPARATUS

CROSS-REFERENCE TO RELATED APPLICATIONS

This application is a continuation of International Application No. PCT/CN2014/072468, filed on Feb. 24, 2014, which is hereby incorporated by reference in its entirety.

TECHNICAL FIELD

The present disclosure relates to the field of information technologies, and in particular, to an information processing method in machine-to-machine communication, and an apparatus.

BACKGROUND

Machine-to-machine communication (M2M) is a networked application and service in which machine intelligent interaction is used as a core. The machine-to-machine communication implements, by embedding a wireless or wired communication module and application processing logic in a machine, information requirements of a user for monitoring, commanding and scheduling, data acquiring and measuring, and the like. In an M2M system, various M2M devices, such as various sensors and controllers, directly access an M2M service platform through an M2M gateway. Therefore, various M2M services such as an electricity metering and Intelligent Transportation are implemented. Data collected by an M2M device may be acquired or control and management may be performed on an M2M device, using a service capability provided by the M2M service platform.

In an M2M system, there are generally multiple device types, where each type includes multiple devices. Devices of different types provide different data or services, but most sensors can provide only original metric data. For example, a temperature sensor can reflect only a temperature value, and a terminal computing device can provide only available memory and central processing unit (CPU) usage. Data required by a user generally needs to be obtained from different data of devices of different types using different computing methods, which complicates M2M system deployment in the prior art, and leads to high costs of M2M application.

SUMMARY

In order to overcome a defect of the prior art, embodiments of the present disclosure provide an information processing method in machine-to-machine communication, and an apparatus to make it simpler and more efficient to deploy an M2M system and develop an M2M application, thereby reducing costs for using M2M, and improving flexibility of the M2M system.

According to a first aspect, an embodiment of the present disclosure provides a method in machine-to-machine communication, including receiving an aggregation resource creation request, determining an identifier of an aggregated resource and an aggregation manner according to the aggregation resource creation request, creating an aggregation resource according to the determined identifier of the aggregated resource and the determined aggregation manner, where an attribute of the aggregation resource includes the identifier of the aggregated resource and the aggregation manner, and performing information aggregation according to the created aggregation resource.

In a first possible implementation manner of the first aspect, the performing information aggregation according to the attribute of the aggregation resource includes acquiring a current state of the aggregated resource, and performing information aggregation according to the aggregation manner included in the attribute of the aggregation resource to obtain an aggregation result.

In a second possible implementation manner of the first aspect, the received aggregation resource creation request includes the identifier of the aggregated resource and the aggregation manner, where the aggregation manner is a specified computing resource.

In a third possible implementation manner of the first aspect, the received aggregation resource creation request includes an aggregation source expectation and the aggregation manner, and the aggregation manner includes a specified computing resource, and the determining an identifier of an aggregated resource includes sending a resource discovery request to a discovery resource, where the resource discovery request carries the aggregation source expectation, receiving a resource identifier that meets the aggregation source expectation and is returned by the discovery resource, and using the resource identifier as the identifier of the aggregated resource.

In a fourth possible implementation manner of the first aspect, the received aggregation resource creation request includes an aggregation source expectation and an aggregation result expectation, the determining an identifier of an aggregated resource includes sending a resource discovery request to a discovery resource, where the resource discovery request carries the aggregation source expectation, receiving a resource identifier that meets the aggregation source expectation and is returned by the discovery resource, and using the resource identifier as the identifier of the aggregated resource, and the determining an aggregation manner includes sending a computing resource discovery request to the discovery resource, where the request carries the aggregation result expectation, receiving a computing resource that meets the aggregation result expectation and is returned by the discovery resource, and using the computing resource as the aggregation manner.

In a fifth possible implementation manner of the first aspect, there are multiple computing resources that are used as the aggregation manner, and the method further includes determining that the aggregation resource creation request includes a flag of "multiple results allowed", and using, as the aggregation manner, the multiple computing resources that meet the aggregation result expectation, and when access to the aggregation resource by an application program is received, returning an aggregation result of the multiple computing resources.

In a sixth possible implementation manner of the first aspect, the computing resource that meets the aggregation result expectation is linking of at least two computing resources.

In a seventh possible implementation manner of the first aspect, the received aggregation resource creation request includes an aggregation occasion parameter, and an M2M device actively performs information aggregation or passively performs information aggregation according to the aggregation occasion parameter, and stores an aggregation result in an aggregation result resource.

In an eighth possible implementation manner of the first aspect, the actively performing information aggregation includes establishing, by the M2M device, a subscription notification relationship with the aggregated resource, where when the aggregated resource changes, the current state of the aggregated resource is sent to the aggregation resource, and performing, by the M2M device, information aggregation according to the received current state of the aggregated resource and the aggregation manner, or monitoring, by the M2M device, a change of the aggregated resource by polling, and when a change of the aggregated resource is polled, updating the aggregation result resource.

In a ninth possible implementation manner of the first aspect, the passively performing information aggregation includes, after the M2M device receives a request message for accessing the aggregation result resource by an application, acquiring the current state of the aggregated resource, performing information aggregation according to the aggregation manner to obtain an aggregation result, and returning the aggregation result to the application.

In a tenth possible implementation manner of the first aspect, before creating the aggregation resource, the method further includes verifying validity, to verify whether the determined aggregation resource can be processed in the aggregation manner.

According to a second aspect, an embodiment of the present disclosure provides an M2M device, including a communication module, configured to receive an aggregation resource creation request, a determining module, configured to determine an identifier of an aggregated resource and an aggregation manner according to the received aggregation resource creation request, a creation module, configured to create an aggregation resource according to the determined identifier of the aggregated resource and the determined aggregation manner, where an attribute of the aggregation resource includes the identifier of the aggregated resource and the aggregation manner, and an aggregation module, configured to perform information aggregation according to the created aggregation resource.

In a first possible implementation manner of the second aspect, the aggregation module is configured to acquire a current state of the aggregated resource, and perform information aggregation according to the aggregation manner included in the attribute of the aggregation resource to obtain an aggregation result.

In a second possible implementation manner of the second aspect, the aggregation resource creation request received by the communication module includes the identifier of the aggregated resource and the aggregation manner, and the aggregation manner is a specified computing resource.

In a third possible implementation manner of the second aspect, the aggregation resource creation request received by the communication module includes an aggregation source expectation and the aggregation manner, and the aggregation manner includes a specified computing resource, and that the determining module determines the identifier of the aggregated resource includes that the determining module sends a resource discovery request to a discovery resource, where the resource discovery request carries the aggregation source expectation, and the determining module further receives a resource identifier that meets the aggregation source expectation and is returned by the discovery resource, and uses the resource identifier as the identifier of the aggregated resource.

In a fourth possible implementation manner of the second aspect, the aggregation resource creation request received by the communication module includes an aggregation source expectation and an aggregation result expectation, that the determining module determines the identifier of the aggregated resource includes that the determining module sends a resource discovery request to a discovery resource, where the resource discovery request carries the aggregation source expectation, and the determining module further receives a resource identifier that meets the aggregation source expectation and is returned by the discovery resource, and uses the resource identifier as the identifier of the aggregated resource, that the determining module determines the aggregation manner includes that the determining module sends a computing resource discovery request to the discovery resource, where the request carries the aggregation result expectation, and the determining module further receives a computing resource that meets the aggregation result expectation and is returned by the discovery resource, and uses the computing resource as the aggregation manner.

In a fifth possible implementation manner of the second aspect, there are multiple computing resources that meet the aggregation result expectation, and the determining module is further configured to determine that the aggregation resource creation request includes a flag of "multiple results allowed", and use, as the aggregation manner, the multiple computing resources that meet the aggregation result expectation, and the communication module is further configured to receive access to the aggregation resource by an application program, and return an aggregation result of the multiple computing resources.

In a sixth possible implementation manner of the second aspect, the computing resource that meets the aggregation result expectation is linking of at least two computing resources.

In a seventh possible implementation manner of the second aspect, the aggregation resource creation request received by the communication module includes an aggregation occasion parameter, and the aggregation module actively performs information aggregation or passively performs information aggregation according to the aggregation occasion parameter, and stores an aggregation result in an aggregation result resource.

In an eighth possible implementation manner of the second aspect, that the aggregation module actively performs information aggregation includes that the aggregation module establishes a subscription notification relationship with the aggregated resource, where when the aggregated resource changes, the current state of the aggregated resource is sent to the aggregation resource, and the aggregation module performs information aggregation according to the received current state of aggregated resource and the aggregation manner, or the aggregation module monitors a change of the aggregated resource by polling, and when a change of the aggregated resource is polled, updates the aggregation result resource.

In a ninth possible implementation manner of the second aspect, that the aggregation module passively performs information aggregation includes, after the communication module receives a request message for accessing the aggregation result resource by an application, the aggregation module acquires the current state of the aggregated resource, and performs information aggregation according to the aggregation manner to obtain an aggregation result, and the communication module returns the aggregation result to the application.

In the embodiments of the present disclosure, an aggregation resource is created on an M2M device, information aggregation is automatically performed, and particularly, an aggregated resource and an aggregation manner are automatically adapted and selected according to an aggregation source expectation and an aggregation result expectation to make it simpler and more efficient to deploy an M2M system and develop an M2M application, thereby reducing costs for using M2M, and improving flexibility of the M2M system.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
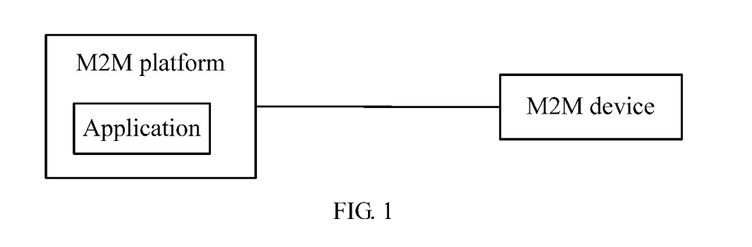
FIG. 1 is an architecture diagram of an M2M information aggregation system according to an embodiment of the present disclosure.

An embodiment of the present disclosure provides an M2M information aggregation system. As shown in FIG. 1, the M2M information aggregation system includes an M2M service platform and an M2M device. Various M2M devices, such as a sensor and a microcontroller, directly access the M2M service platform, or remotely access the M2M service platform through an M2M gateway. Various M2M applications, such as an electricity meter system and an Intelligent Transportation System, are generally deployed on the M2M service platform, and acquire data collected by an M2M terminal or perform remote control and management on an M2M terminal, using a service capability provided by the M2M service platform.

The aggregation refers to using information about one or more resources in a system as input, and using a computation result obtained by means of logical computation as an output resource to provide external access.

In this embodiment of the present disclosure, the M2M application controls the M2M device to create an aggregation resource, after successfully creating the aggregation resource, the M2M device performs information aggregation, and aggregated information may be acquired by means of access by the application, which includes that the M2M platform is configured to send an aggregation resource creation request to the M2M device, where the creation request carries a parameter for creating an aggregation resource, and the M2M device is configured to receive the aggregation resource creation request sent by the platform, determine an identifier of an aggregated resource and an aggregation manner according to the aggregation resource creation request, create the aggregation resource according to the determined identifier of the aggregated resource and the determined aggregation manner, where an attribute of the aggregation resource includes the identifier of the aggregated resource and the aggregation manner, and perform information aggregation according to the created aggregation resource.

Figure 2:
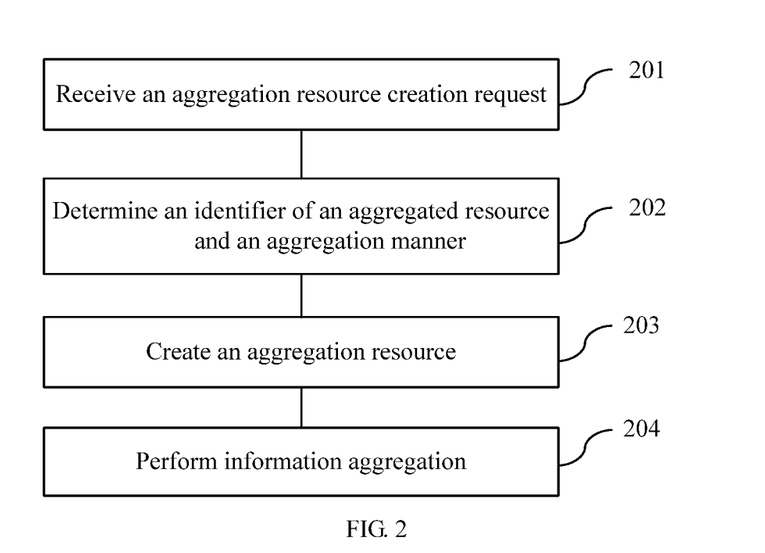
FIG. 2 is a flowchart of an information aggregation method according to an embodiment of the present disclosure.

Based on the system in the foregoing embodiment, an embodiment of the present disclosure provides an M2M information aggregation method. As shown in FIG. 2, the method includes the following steps.

201. Receive an aggregation resource creation request.

The creation request may be generated by an application program or another apparatus, including a device, a gateway, and a platform. For example, an application on an M2M platform sends the aggregation resource creation request to an M2M device. In an embodiment, the creation request may be directly generated on an M2M device. For example, the creation request is directly generated by a user by means of configuration in the M2M device, then, receiving input of the user is receiving the aggregation resource creation request. The creation request may carry a parameter for creating an aggregation resource. The creation request may directly include an identifier of an aggregated resource and an aggregation manner, or the creation request may not directly carry an identifier of an aggregated resource, but carry an aggregation source expectation, and the M2M device determines an identifier of an aggregated resource according to the aggregation source expectation. Further, the aggregation manner may not be specified in the creation request, but an aggregation result expectation is carried in the creation request, and the M2M device determines an appropriate aggregation manner according to the aggregation result expectation.

The aggregation source expectation is a characteristic description, made by an aggregation resource creator, of a range of an aggregated resource, and is used to set a condition for determining whether a resource can be an aggregated resource of a current aggregation resource.

The aggregation manner indicates that a process of corresponding logical computation is performed on the aggregated resource. An aggregation result can be obtained using the logical computation. In M2M, the process of logical computation may be provided by a computing resource, and the computing resource is a resource used to perform logical computation. The aggregation manner may simply include a single computing resource. Further, the aggregation manner may also be formed by linking multiple computing resources. The linking multiple computing resources indicates that output of one or more computing resources is used as input of another computing resource.

The aggregation result expectation indicates a characteristic description, made by the aggregation resource creator, of an aggregation result resource. The aggregation manner may be determined using the aggregation result expectation.

The M2M device performs information aggregation according to the aggregation resource, where aggregated information forms an aggregation result. After the aggregation result is obtained, an aggregation result resource may be formed, and the aggregation result resource may be located in the M2M device or the M2M platform for access by an application. Further, before sending the aggregation resource creation request, the M2M application may determine an identifier of the aggregation result resource. When sending the aggregation resource creation request, the aggregation resource creation request carries the identifier of the aggregation result resource. After the M2M device aggregates information, the aggregation result is stored in a specified aggregation result resource.

After the aggregation resource is created, there may be two aggregation occasions for information aggregation: active aggregation and passive aggregation. The active aggregation indicates that the aggregation result resource is actively updated according to a preset rule. For example, a subscription relationship with the aggregated resource is established, and if a change of the aggregated resource meets a subscription condition, information aggregation is performed, to update the aggregation result resource, or a change of the aggregated resource is monitored by polling, and the aggregation result resource is updated immediately after the aggregated resource changes. The passive aggregation indicates that a current state of the aggregated resource is acquired, an aggregation result is obtained according to the aggregation manner, and the aggregation result is returned only when the aggregation result resource is accessed. The aggregation resource creation request may carry a specified aggregation occasion, and the M2M device may perform information aggregation according to the aggregation occasion carried in the creation request.

There may be multiple aggregation manners determined by the M2M, therefore, there may be multiple aggregation results. An application may further include a flag of "multiple results allowed" in the aggregation resource creation request, where the flag indicates that the application allows the M2M device to provide multiple aggregation results. When the application accesses the aggregation resource, the device provides the application with the multiple aggregation results, and the application processes the multiple aggregation results.

The M2M device may perform corresponding processing according to different parameters carried in the creation request.

202. Determine an identifier of an aggregated resource and an aggregation manner.

The M2M device determines the identifier of the aggregated resource and the aggregation manner according to the aggregation resource creation request. The aggregation resource creation request may directly carry the identifier of the aggregated resource, or may carry the aggregation source expectation that is used to describe a characteristic of the aggregated resource. The characteristic may be a semantic description used to match metadata of the aggregated resource.

The aggregation resource creation request may directly carry the aggregation manner, or may provide the aggregation result expectation. When the creation request carries the aggregation result expectation, the M2M device may determine the aggregation manner according to the aggregation result expectation, and a specific process includes determining a single computing resource, multiple computing resources, or linking of multiple computing resources as the aggregation manner.

203. Create an aggregation resource.

The aggregation resource is created according to the received aggregation resource creation request, and an attribute of the aggregation resource includes the identifier of the aggregated resource and the aggregation manner. The created aggregation resource may include some attributes in the following table, for example:

TABLE 1

Attribute of an aggregation resource

| Parameter | Description |
| --- | --- |
| Identifier of an aggregated resource | This parameter indicates an identifier of an aggregated resource, for example, a URI. |
| Aggregation manner | A single computing resource, or linked computing resources. The aggregation manner indicates that a process of corresponding logical computation is performed on an aggregated resource. An aggregation result can be obtained using the logical computation. |
| Aggregation result | This parameter indicates information about an aggregation result resource, and may be the aggregation result resource itself, or an identifier of the aggregation result resource. |
| Aggregation occasion | Two aggregation occasions are included: active occasion and passive occasion. A default value may be set by a system. |
| Flag of "multiple results allowed" | This parameter indicates whether an aggregation resource creator allows multiple results to appear in a process of determining an aggregation result. |

204. Perform information aggregation.

After the aggregation resource is created, there may be two aggregation occasions for information aggregation: active aggregation and passive aggregation. The aggregation occasion may be specified by the application and carried in the sent aggregation resource creation request, or may be set by the M2M device when the M2M device creates the aggregation resource.

If the aggregation occasion is the active aggregation, the M2M device actively updates the aggregation result resource according to a preset rule. For example, a subscription notification relationship with the aggregated resource is established. Each time when a change of the aggregated resource meets a subscription condition, a notification message is sent to the aggregation resource, where the notification message carries a state of the aggregated resource, the device performs information aggregation according to a latest state and the aggregation manner, to update the aggregation result resource. In this way, the aggregation result resource always keeps up-to-date according to a change of the aggregated resource. In an embodiment, the M2M device monitors a change of the aggregated resource by polling, and when a change of the aggregated resource is polled, updates the aggregation result resource. When an application accesses the aggregation result resource, aggregated information is directly returned to the application.

If the aggregation occasion is the passive aggregation, a current state of the aggregated resource is acquired, an aggregation result is obtained according to the aggregation manner, and the aggregation result is returned to an application only when the aggregation result resource is accessed by the application.

For different application scenarios in the present disclosure, a further embodiment is provided in the following. In order to aggregate information by different M2M devices, different technical resources are required to provide same output. For example, in the following embodiments, different M2M devices may obtain different physical performance indicators, such as available memory, CPU usage, CPU temperature, and a remaining capacity of a magnetic disk. Some M2M devices may provide all of these indicators, and some M2M devices can provide only a part of these indicators. A platform provides different computing resources to adapt to different M2M devices. As shown in the following table, output of computing resources A, B, C, and D is a "load state" of a device. Different M2M devices can provide uniform output using different computing resources. In the following embodiments, it is assumed that computing resources A to E are preconfigured in the M2M platform. As shown in Table 2:

TABLE 2

| Computing resource | URI | Input (physical performance indicator set) | Output |
|---|---|---|---|
| Computing resource A | http://m2msp/Cal_A | Available memory and CPU usage | Load state |
| Computing resource B | http://m2msp/Cal_B | Available memory, CPU usage, and CPU temperature | Load state |
| Computing resource C | http://m2msp/Cal_C | Available memory, CPU usage, CPU temperature, and remaining power | Load state |
| Computing resource D | http://m2msp/Cal_D | Available memory, CPU usage, CPU temperature, remaining power, and remaining capacity of a magnetic disk | Load state |
| Computing resource E | http://m2msp/Cal_E | CPU idle time and CPU busy time | CPU usage |

Different computing resources may obtain a normalized result using different computing formulas. For example, for the computing resource A, a computing formula for a load state may be as follows:

$$(1-(\text{Available memory/Total memory}))*50\%+\text{CPU usage}*50\%.$$

The memory usage and the CPU usage herein each account for 50% of output of the load state. The memory usage and the CPU usage may also be adjusted to different percentages.

For another example, for the computing resource C, a computing formula for the load state may be as follows:

$$(1-(\text{Available memory/Total memory}))*30\%+\text{CPU usage}*30\%+(\text{CPU temperature/CPU maximum temperature})*20\%+(1-(\text{Remaining power/Maximum power}))*20\%.$$

The memory usage and the CPU usage herein each account for 30% of output of the load state, and temperature and power each account for 20%. The memory usage and the CPU usage may also be adjusted to different percentages.

A method for computing output "CPU usage" of the computing resource E is as follows:

$$\text{CPU busy time}/(\text{CPU idle time}+\text{CPU busy time})$$

Although computing methods for the four computing resources in the foregoing Table 2 are different, output is uniform. For example, the load states are expressed in percentage. In this way, different M2M devices perform information aggregation using the foregoing different computing resources, and the obtained output is uniform.

Figure 3:
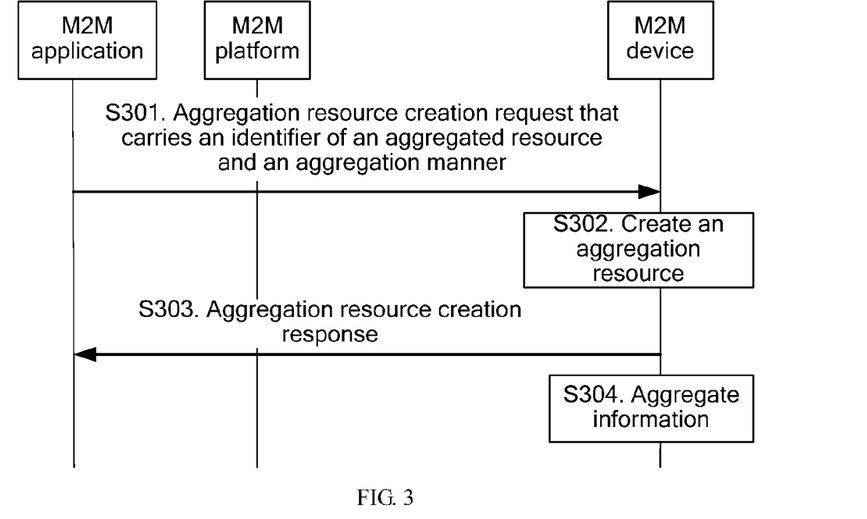
FIG. 3 is a flowchart of another information aggregation method according to an embodiment of the present disclosure.

In an embodiment of the present disclosure shown in FIG. 3, in order to acquire a load state of an M2M device, an application on an M2M platform sends an aggregation resource creation request to the M2M device, where the creation request directly carries an identifier of an aggregated resource and an aggregation manner, an aggregation resource may obtain a load state of a current device by aggregating CPU usage and available memory, which includes:

S301. In this embodiment, the application already knows identifiers of an available memory resource and a CPU usage resource that are of some devices. For example, identifiers of an available memory resource and a CPU usage resource that are of a device X are respectively http://device_X/available_memory, http://device_X/cpu_rate.

Therefore, the application may directly choose a computing resource A as the aggregation manner of the aggregation resource to obtain a load state. The application sends the aggregation resource creation request to the M2M device, where the aggregation resource creation request includes the following parameters:

identifiers of aggregated resources:
http://device_X/available_memory,
http://device_X/cpu_rate; and
an aggregation manner: http://m2msp/Cal_A.

S302. After the M2M device receives the aggregation resource creation request, the M2M device creates an aggregation resource according to the creation request. An attribute of the created aggregation resource includes the identifier of the aggregated resource and the aggregation manner. Before creating the aggregation resource, the M2M device may further verify validity, to verify whether a provided aggregated resource can be processed in the aggregation manner. The device sends a computing resource acquiring request to an M2M platform in which the computing resource A is located, and after acquiring the computing resource A, checks that input resources of the computing resource A are the available memory and the CPU usage, which are consistent with a type that is of the aggregated resource and is provided in the aggregation resource. Therefore, a validity verification of the aggregation resource may be considered successful.

S303. Return a message that the aggregation resource is successfully created.

After the aggregation resource is successfully created, a success response may be returned to a request creator. If the creation fails, a failure response is returned.

S304. Perform information aggregation.

After the aggregation resource is created, there may be two aggregation occasions for information aggregation: active aggregation and passive aggregation. The aggregation occasion may be specified by the application and carried in the sent aggregation resource creation request, or may be set by the M2M device when the M2M device creates the aggregation resource.

If the aggregation occasion is the active aggregation, the M2M device actively updates an aggregation result resource according to a preset rule. For example, a subscription notification relationship with the aggregated resource is established. Each time a change of the aggregated resource meets a subscription condition, a notification message is sent to the aggregation resource, where the notification message carries a state of the aggregated resource, the device performs information aggregation according to a latest state and the aggregation manner, to update the aggregation result resource. In this way, the aggregation result resource always keeps up-to-date according to a change of the aggregated resource. In an embodiment, the M2M device monitors a change of the aggregated resource by polling, and when a change of the aggregated resource is polled, updates the aggregation result resource. When an application accesses the aggregation result resource, aggregated information is directly returned to the application.

If the aggregation occasion is the passive aggregation, a current state of the aggregated resource is acquired, an aggregation result is obtained according to the aggregation manner, and the aggregation result is returned to an application only when the aggregation result resource is accessed by the application.

In this embodiment of the present disclosure, an aggregation resource is created on an M2M device, information aggregation is automatically performed to make it simpler and more efficient to deploy an M2M system and develop an M2M application, thereby reducing costs for using M2M, and improving flexibility of the M2M system.

Figure 4:
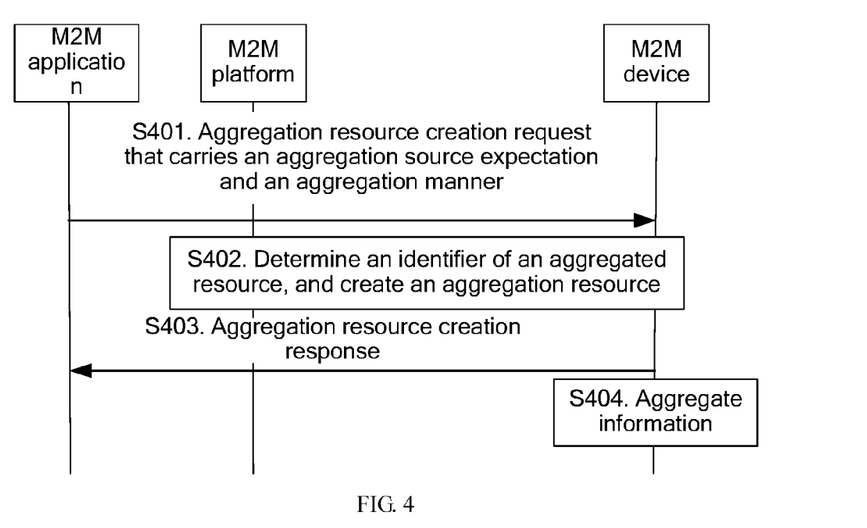
FIG. 4 is a flowchart of still another information aggregation method according to an embodiment of the present disclosure.

In an embodiment of the present disclosure shown in FIG. 4, an application on an M2M platform does not know which specific physical performance indicators on an M2M device can be used to obtain a load state, to acquire the load state of the M2M device, the application includes an aggregation source expectation in a sent aggregation resource creation request, which includes S401. In this embodiment, the application does not know which specific physical performance indicators on the device can be used to obtain the load state, and therefore includes the aggregation source expectation to describe a characteristic of an aggregated resource.

A Resource Description Framework (RDF) may be used to describe metadata. The RDF is a language used to describe a resource itself and a relationship between resources, and the RDF is based on Extensible Markup Language (XML). For example, metadata of a CPU usage resource is as follows:

```
<rdf>
    <m2m:resourceType>CONTAINER</m2m:resourceType>
    <m2m:dataDescription>device state measurement</m2m:dataDescription>
    <m2m:dataType>CPU RATE</m2m:dataType>
    <m2m:dataUnit>%</m2m:dataUnit>
</rdf>
``` where a meaning of each part is as follows:

an rdf tag indicates that the metadata is in a format of an RDF description;

"m2m:resourceType" indicates that, in an m2m namespace, a resource type of the resource is CONTAINER, that is, a data container;

"m2m:dataType" indicates that a data type of the resource is a CPU usage;

"m2m:dataUnit" indicates that a data unit of the resource is percentage; and that "resourceDescription" is "device state measurement" indicates that the resource is a physical performance indicator of a device.

In this embodiment, the application does not know which specific physical performance indicators on the device can be used to obtain the load state, and therefore includes the aggregation source expectation in an aggregation resource creation request, where the aggregation source expectation is physical performance indicators of an expected device, which include:

an aggregation source expectation:

```
<rdf>
<m2m:dataDescription>device state measurement</m2m:dataDescription>
</rdf>;
``` and an aggregation manner: http://m2msp/Cal_A.

The aggregation source expectation includes "m2mdataDescription" whose content is "device state measurement", which indicates that the aggregated resource needs to be a resource of a physical performance indicator of a device. After the aggregation resource creation request is received, because the request does not provide an identifier of the aggregated resource but provides the aggregation source expectation, the device further determines the identifier of the aggregated resource.

The M2M device may discover, using a discovery resource, a resource that meets the aggregation source expectation, and use the resource as the aggregated resource. The discovery resource is a virtual resource, and does not save any static data. However, when the discovery resource is accessed, the discovery resource can return, according to a permission of a visitor, a list of resources that can be accessed by the visitor. In this embodiment, an acquiring request for resource discovery carries the aggregation source expectation, and the discovery resource performs matching of metadata of a local discoverable resource according to an RDF description in the aggregation source expectation. In this embodiment, it is assumed that a result of the matching is that metadata of two resources is found that can match the aggregation source expectation, and the metadata of the two resources is respectively:

http://device_X/available_memory,
http://device_X/cpu_rate.

The two resources may be determined as the identifier of the aggregated resource.

After the identifier of the aggregated resource is determined, because a computing resource A is provided as the aggregation manner in this embodiment, that is, the computing resource A is used as the aggregation manner, and then the aggregation resource may be created.

S402. After the M2M device determines an identifier of the aggregated resource, the M2M device creates an aggregation resource according to a creation request. An attribute of the created aggregation resource includes the identifier of the aggregated resource and the aggregation manner. Likewise, before creating the aggregation resource, the M2M device may further verify validity, to verify whether the determined aggregated resource can be processed in the aggregation manner. The device sends a computing resource acquiring request to an M2M platform in which the computing resource A is located, and after acquiring the computing resource A, checks that input resources of the computing resource A are the available memory and the CPU usage, which are consistent with a type that is of the aggregated resource and is provided in the aggregation resource. Therefore, a validity verification of the aggregation resource may be considered successful.

S403. Return a message that the aggregation resource is successfully created.

After the aggregation resource is successfully created, a success response may be returned to a request creator. If the creation fails, a failure response is returned.

S404. Perform information aggregation.

Similar to the description of the foregoing step S304, after the aggregation resource is created, there may be two aggregation occasions for information aggregation: active aggregation and passive aggregation. The aggregation occasion may be specified by the application and carried in the sent aggregation resource creation request, or may be set by the M2M device when the M2M device creates the aggregation resource. For the active aggregation and the passive aggregation, refer to the detailed description of step S304.

Figure 5:
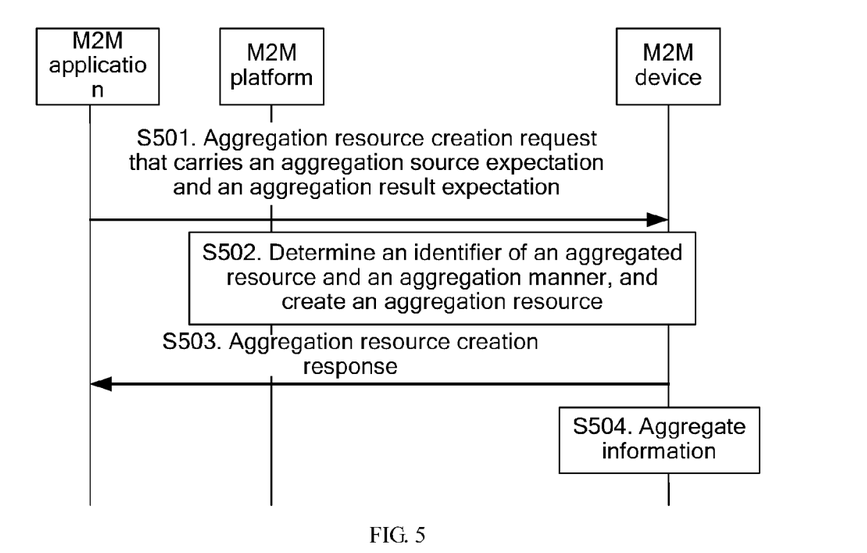
FIG. 5 is a flowchart of yet another information aggregation method according to an embodiment of the present disclosure.

In an embodiment of the present disclosure shown in FIG. 5, an application on an M2M platform simultaneously sends a request for creating an aggregation resource to multiple M2M devices, for example, M2M devices X, Y, and Z. Physical performance indicators that can be provided by the three devices may be different. The application does not know which physical performance indicators can be supported by the devices, and also does not need to know which specific device should use which computing resource to obtain a load state. In order to acquire a load state of an M2M device, the application includes an aggregation source expectation and an aggregation result expectation in the sent aggregation resource creation request, and the M2M device itself searches for and determines an appropriate aggregation resource and aggregation manner, which includes:

S501. In this embodiment, the application on the M2M platform sends the aggregation resource creation request to the M2M device, where the creation request carries the aggregation source expectation and the aggregation result expectation.

The aggregation source expectation is used to describe a characteristic of an aggregated resource, and the aggregation result expectation is also a description of a characteristic and used to describe a characteristic of an aggregation result resource. An RDF may also be used to perform description. The aggregation resource creation request includes:

an aggregation source expectation:

```
<rdf>
   <m2m:dataDescription>device state measurement</m2m:dataDescription>
</rdf>;
``` an aggregation result expectation:

```
<rdf>
   <m2m:outputDescription>device load state<m2m:outputDescription>
</rdf>;
``` and multiple results allowed: Y.

A process of processing by the M2M device that receives the aggregation resource creation request is consistent, including determining an identifier of the aggregated resource according to the aggregation source expectation, and further determining an aggregation manner according to an output result expectation. A manner of determining the identifier of the aggregated resource is the same as that in the embodiment shown in FIG. 4. However, the manner of determining the aggregation manner differs according to different statuses of different devices. Specific processes are separately described according to different devices X, Y, and Z as follows.

An M2M device X can provide two resources, available memory and CPU usage, as described above, the device X determines, using a discovery resource, that identifiers of the two resources that match the aggregation source expectation are respectively, http://device_X/available_memory, and http://device_X/cpu_rate.

After receiving the aggregation resource creation request, the device X may further discover, using a discovery resource in M2M, a computing resource that meets the aggregation result expectation, and use the computing resource as the aggregation manner. The discovery resource performs matching of metadata of a discoverable resource on the M2M platform according to an RDF description in the aggregation result expectation. In this embodiment, the discovery resource performs matching according to the aggregation result expectation, that is, "device load state". The M2M device sends a "computing resource discovery request" to the M2M platform, where the request is destined for the discovery resource on the M2M platform, and the request carries the aggregation result expectation, that is, "device load state".

The M2M platform returns, to the device X according to the computing resource discovery request, four computing resources, that is, computing resources A, B, C, and D, as shown in Table 1. The reason for returning the four computing resources is that output of the four computing resources all meets the aggregation result expectation "device load state". In this case, the device X may further check whether input resources of the four computing resources A, B, C, and D are a subset of an aggregated resource set. For the device X, the aggregated resource has only available memory and CPU usage, and thus, only the computing resource A can pass a check to determine the computing resource A as the aggregation manner of the aggregation resource.

An M2M device Y can provide three physical performance indicators: available memory, CPU usage, and CPU temperature, as described above, the device Y determines, using a discovery resource, that identifiers of the three resources that match the aggregation source expectation are respectively, http://device_Y/available_memory, http://device_Y/cpu_rate, and http://device_Y/cpu_heat.

After receiving the aggregation resource creation request, the device Y may further discover, using a discovery resource in M2M, a computing resource that meets the aggregation result expectation, and use the computing resource as the aggregation manner. The discovery resource performs matching of metadata of a discoverable resource on the M2M platform according to an RDF description in the aggregation result expectation. In this embodiment, the discovery resource performs matching according to the aggregation result expectation, that is, "device load state". The M2M device Y sends a "computing resource discovery request" to the M2M platform, where the request is destined for the discovery resource on the M2M platform, and the request carries the aggregation result expectation, that is, "device load state".

The M2M platform returns, to the device Y according to the computing resource discovery request, four computing resources, that is, computing resources A, B, C, and D, as shown in Table 1. The reason for returning the four computing resources is that output of the four computing resources all meets the aggregation result expectation "device load state". In this case, the device Y may further check whether input resources of the four computing resources A, B, C, and D are a subset of an aggregated resource set. For the device Y, the aggregated resource has only available memory, CPU usage, and CPU temperature, and thus, only the computing resources A and B can pass a check to determine that the computing resources A and B may be the aggregation manner of the aggregation resource.

The device Y may further determine whether the aggregation resource creation request includes a flag of "multiple results allowed". If the aggregation resource creation request includes the flag of "multiple results allowed", the application allows the device Y to provide multiple aggregation results. If multiple results are not allowed, the device Y further determines that an input resource of the computing resource B best matches the aggregated resource, therefore, the computing resource B is finally determined as the aggregation manner.

It is assumed that an M2M device Z can provide three physical performance indicators available memory, a CPU idle time, and a CPU busy time, as described above, the device Z may determine, using a discovery resource, that identifiers of the three resources that match the aggregation source expectation are respectively, http://device_Z/available_memory, http://device_Z/cpu_idle, and http://device_Z/cpu_busy. It should be noted that, the CPU usage herein is not CPU usage provided by the foregoing device X or device Y.

After receiving the aggregation resource creation request, the device Z may further discover, using a discovery resource in M2M, a computing resource that meets the aggregation result expectation, and use the computing resource as the aggregation manner. The discovery resource performs matching of metadata of a discoverable resource on the M2M platform according to an RDF description in the aggregation result expectation. In this embodiment, the discovery resource performs matching according to the aggregation result expectation, that is, "device load state". The M2M device Z sends a "computing resource discovery request" to the M2M platform, where the request is destined for the discovery resource on the M2M platform, and the request carries the aggregation result expectation, that is, "device load state".

The M2M platform returns, to the device Z according to the computing resource discovery request, four computing resources, that is, computing resources A, B, C, and D, as shown in Table 1. The reason for returning the four computing resources is that output of the four computing resources all meets the aggregation result expectation "device load state". In this case, the device Z may further check whether input resources of the four computing resources A, B, C, and D are a subset of an aggregated resource set. For the device Z, the aggregated resource has only available memory, a CPU idle time, and a CPU busy time, and thus, none of the computing resources A, B, C, and D can pass a match check.

Because none of the computing resources A, B, C, and D can directly pass an input match check, the device Y continues to check whether matching can be performed by linking computing resources.

For example, for the computing resource A, input resources are available memory and CPU usage, and resources that can be provided by the device Z are available memory, a CPU idle time, and a CPU busy time. Thus an input resource description that cannot be matched is the "CPU usage." The device Z further determines whether the "CPU usage" can be obtained using another computing resource. The device Z sends a "computing resource discovery request" to the M2M platform, where the request is destined for the discovery resource on the M2M platform, and the request carries an expected resource, that is, the "CPU usage". The M2M platform returns a computing resource E, output of the computing resource E is the "CPU usage", and input resources are the CPU idle time and the CPU busy time. The device Z can provide the CPU idle time and the CPU busy time. Therefore, the output of the computing resource E may be used as the input of the computing resource A. Therefore, linking of the computing resource E and the computing resource A forms the aggregation manner.

For the computing resource B, input physical performance indicators include available memory, CPU usage, and CPU temperature. The CPU usage may also be obtained by the computing resource E using the foregoing method, after requesting, from the platform, the discovery resource to discover the "CPU temperature", the device Z receives a "failure" response returned by the platform, which indicates that the CPU temperature cannot be obtained using another computing resource. Therefore, a processing process of the computing resource B fails. Similarly, processing processes of the computing resources C and D also fail.

In conclusion, the M2M device Z determines that linking of the computing resources E and A is the aggregation manner.

S502. After M2M devices X, Y, and Z separately determine an identifier of an aggregated resource and an aggregation manner, the M2M device creates an aggregation resource according to the creation request. An attribute of the created aggregation resource includes the identifier of the aggregated resource and the respective determined aggregation manner. Likewise, before creating the aggregation resource, the M2M device may further verify validity, to verify whether the determined aggregated resource can be processed in the aggregation manner. The device sends a computing resource acquiring request to an M2M platform in which the computing resource A is located, and after acquiring the computing resource A, checks that input resources of the computing resource A are the available memory and the CPU usage, which are consistent with a type that is of the aggregated resource and is provided in the aggregation resource. Therefore, validity verification of the aggregation resource may be considered successful.

S503. Return a message that the aggregation resource is successfully created.

After the aggregation resource is successfully created, a success response may be returned to a request creator. If the creation fails, a failure response is returned.

S504. Perform information aggregation.

Likewise, similar to the description of the foregoing step S304, after the aggregation resource is created, there may be two aggregation occasions for information aggregation active aggregation and passive aggregation. The aggregation occasion may be specified by the application and carried in the sent aggregation resource creation request, or may be set by the M2M device when the M2M device creates the aggregation resource. For details about the active aggregation and the passive aggregation, refer to the detailed description of step S304.

For the device Y, if the aggregation resource creation request includes a flag of "multiple results allowed", the application allows the device Y to provide multiple aggregation results. The device Y may perform information aggregation separately according to the computing resource A and the computing resource B. When the application accesses the aggregation resource, the device Y may return multiple results to the application, and the application performs further processing on the multiple results.

For the device Z, because the determined aggregation manner is linking of the computing resources E and A, when information aggregation is being performed, aggregation of the computing resource E is first performed, output "CPU usage" of the aggregation is used as input of the computing resource A, and aggregation is performed on the input of the computing resource A and another input "available memory", to obtain a final aggregation result.

In this embodiment of the present disclosure, an aggregation resource is created on an M2M device, information aggregation is automatically performed, and particularly, an aggregated resource and an aggregation manner are automatically adapted and selected according to an aggregation source expectation and an aggregation result expectation to make it simpler and more efficient to deploy an M2M system and develop an M2M application, thereby reducing costs for using M2M, and improving flexibility of the M2M system.

Figure 6:
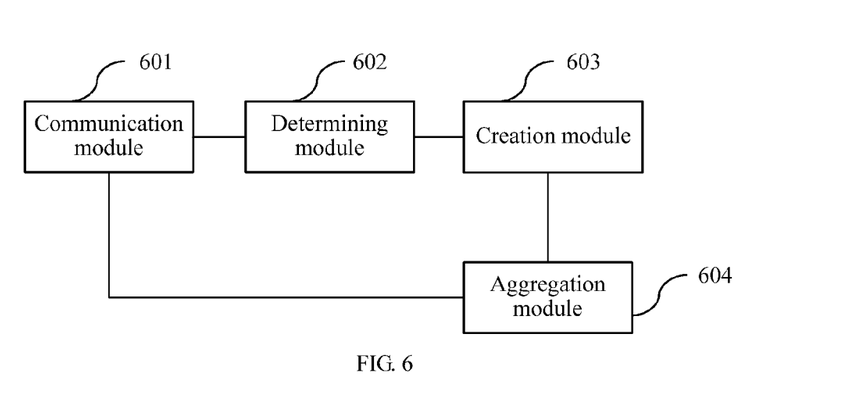
FIG. 6 is a schematic structural diagram of an M2M device according to an embodiment of the present disclosure.

An embodiment of the present disclosure further provides an M2M device, configured to implement the embodiments of the information aggregation methods shown in the foregoing FIG. 2 to FIG. 5. As shown in FIG. 6, the M2M device provided in this embodiment of the present disclosure includes a communication module 601, configured to receive an aggregation resource creation request, a determining module 602, configured to determine an identifier of an aggregated resource and an aggregation manner according to the received aggregation resource creation request, a creation module 603, configured to create an aggregation resource according to the determined identifier of the aggregated resource and the determined aggregation manner, where an attribute of the aggregation resource includes the identifier of the aggregated resource and the aggregation manner, and an aggregation module 604, configured to perform information aggregation according to the created aggregation resource.

In an embodiment, the aggregation resource creation request received by the communication module directly includes the identifier of the aggregated resource and the aggregation manner, where the aggregation manner is a specified computing resource.

In an embodiment, the aggregation resource creation request received by the communication module includes an aggregation source expectation and the aggregation manner, and the aggregation manner includes a specified computing resource, and that the determining module determines the identifier of the aggregated resource includes that the determining module sends a resource discovery request to a discovery resource, where the resource discovery request carries the aggregation source expectation, and the determining module further receives a resource identifier that meets the aggregation source expectation and is returned by the discovery resource, and uses the resource identifier as the identifier of the aggregated resource.

In an embodiment, the aggregation resource creation request received by the communication module includes an aggregation source expectation and an aggregation result expectation, that the determining module determines the identifier of the aggregated resource includes that the determining module sends a resource discovery request to a discovery resource, where the resource discovery request carries the aggregation source expectation, and the determining module further receives a resource identifier that meets the aggregation source expectation and is returned by the discovery resource, and uses the resource identifier as the identifier of the aggregated resource, that the determining module determines the aggregation manner includes that the determining module sends a computing resource discovery request to the discovery resource, where the request carries the aggregation result expectation, and the determining module further receives a computing resource that meets the aggregation result expectation and is returned by the discovery resource, and uses the computing resource as the aggregation manner.

In an embodiment, there are multiple computing resources that are used as the aggregation manner, and the determining module is further configured to determine that the aggregation resource creation request includes a flag of "multiple results allowed", where the aggregation manner includes multiple computing resources, and the communication module is further configured to receive access to the aggregation resource by an application program, and return an aggregation result of the multiple computing resources. In an embodiment, the computing resource that meets the aggregation result expectation is linking of at least two computing resources.

In an embodiment, the aggregation resource creation request received by the communication module includes an aggregation occasion parameter, and the aggregation module actively performs information aggregation or passively performs information aggregation according to the aggregation occasion parameter, and stores an aggregation result in an aggregation result resource.

In an embodiment, that the aggregation module actively performs information aggregation includes that the aggregation module establishes a subscription notification relationship with the aggregated resource, where when the aggregated resource changes, a current state of the aggregated resource is sent to the aggregation resource, and the aggregation module performs information aggregation according to the received current state of aggregated resource and the aggregation manner, or the aggregation module monitors a change of the aggregated resource by polling, and when a change of the aggregated resource is polled, updates the aggregation result resource.

In an embodiment, that the aggregation module passively performs information aggregation includes, after the communication module receives a request message for accessing the aggregation result resource by an application, the aggregation module acquires a current state of the aggregated resource, and performs information aggregation according to the aggregation manner to obtain an aggregation result, and the communication module returns the aggregation result to the application.

In an embodiment, the creation module is further configured to, before creating the aggregation resource, verify whether the determined aggregation resource can be processed in the aggregation manner.

In this embodiment of the present disclosure, an aggregation resource is created on an M2M device, information aggregation is automatically performed, and particularly, an aggregated resource and an aggregation manner are automatically adapted and selected according to an aggregation source expectation and an aggregation result expectation to make it simpler and more efficient to deploy an M2M system and develop an M2M application, thereby reducing costs for using M2M, and improving flexibility of the M2M system.

Figure 7:
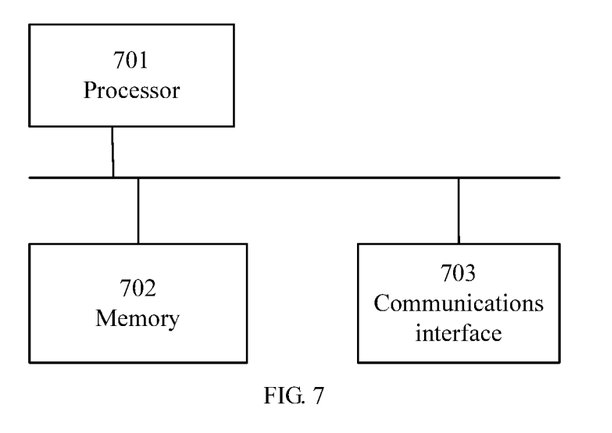
FIG. 7 is a schematic structural diagram of another M2M device according to an embodiment of the present disclosure.

FIG. 7 is another schematic structural diagram of an M2M device according to an embodiment of the present disclosure, where a general-purpose computer system architecture is adopted, program code that executes the solutions of the present disclosure is stored in a memory, and a processor controls the execution. The M2M device includes a processor 701, a memory 702, and a communications interface 703.

The processor may be a general-purpose CPU, a microprocessor, an application-specific integrated circuit (ASIC), or one or more integrated circuits that are used to control execution of programs of the solutions of the present disclosure.

One or more memories included in a computer system may be a non-volatile computer readable storage medium, such as a read-only memory (ROM), or a static storage device of another type that can store static information and an instruction, or may be a magnetic disk memory. These memories may be connected to the processor through a bus. The memory stores the program code that executes the solutions of the present disclosure, for example, programs that executes the methods in the embodiments shown in FIG. 2 to FIG. 5. The program code that executes the solutions of the present disclosure is stored in the memory, and the processor controls the execution.

The communications interface may be an apparatus of a transceiver type to communicate with another device or communications network, such as an Ethernet, a radio access network (RAN), or a wireless local area network (WLAN).

It should be noted that the embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly, for execution processes of specific functions of each unit, reference may be made to partial descriptions in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present disclosure without creative efforts.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A machine-to-machine communication (M2M) device, comprising:
   a receiver configured to receive an aggregation resource creation request sent from a M2M application; and
   a processor coupled to the receiver and configured to:
      determine an aggregation manner and an identifier of an aggregated resource according to the aggregation resource creation request, wherein the aggregation manner indicates a computation process performed on the aggregated resource;
      create the aggregation resource in the M2M device according to the aggregation manner and the identifier of the aggregated resource, wherein an attribute of the aggregation resource comprises the aggregation manner and the identifier of the aggregated resource;
      acquire a current state of the aggregated resource; and
      perform information aggregation according to the aggregation manner comprised in the attribute of the aggregation resource to obtain an aggregation result.

2. The M2M device according to claim 1, wherein the aggregation resource creation request comprises the aggregation manner and the identifier of the aggregated resource, and wherein the aggregation manner is a specified computing resource.

3. The M2M device according to claim 1, wherein the aggregation resource creation request comprises an aggregation source expectation and the aggregation manner, wherein the aggregation manner comprises a specified computing resource, wherein the receiver is further configured to receive a resource identifier that meets the aggregation source expectation, and wherein the processor is further configured to use the resource identifier as the identifier of the aggregated resource.

4. The M2M device according to claim 1, wherein the aggregation resource creation request comprises an aggregation source expectation and an aggregation result expectation, wherein the receiver is further configured to receive a resource identifier that meets the aggregation source expectation, wherein the processor is further configured to use the resource identifier as the identifier of the aggregated resource, wherein the receiver is further configured to receive a computing resource that meets the aggregation result expectation, and wherein the processor is further configured to use the computing resource as the aggregation manner.

5. The M2M device according to claim 4, wherein there are multiple computing resources that meet the aggregation result expectation, and wherein the processor is further configured to:
determine that the aggregation resource creation request comprises a flag indicating "multiple results allowed";
use the multiple computing resources that meet the aggregation result expectation as the aggregation manner;
receive access to the aggregation resource by an application program; and
return an aggregation result comprising the multiple computing resources.

6. The M2M device according to claim 4, wherein the computing resource that meets the aggregation result expectation links at least two computing resources.

7. The M2M device according to claim 1, wherein the processor is further configured to:
establish a subscription notification relationship with the aggregated resource, wherein the subscription notification relationship is that a current state of the aggregated resource is acquired when the aggregated resource changes;
perform information aggregation according to the current state of the aggregated resource and the aggregation manner; and
store the aggregation result in an aggregation result resource.

8. The M2M device according to claim 1, wherein the processor is further configured to:
monitor a change of the aggregated resource by polling; and
update the aggregation result resource when a change of the aggregated resource is polled.

9. The M2M device according to claim 1, wherein the processor is further configured to:
perform information aggregation according to the aggregation resource to obtain an aggregation result after receiving a request message for accessing the aggregation result resource by an application; and
return the aggregation result to the application.

10. The M2M device according to claim 1, wherein the processor is further configured to verify whether the determined aggregation resource can be processed in the aggregation manner before creating the aggregation resource.

11. An information processing method performed in a machine-to-machine communication (M2M) device, comprising:
receiving an aggregation resource creation request sent from a M2M application;
determining an aggregation manner and an identifier of an aggregated resource according to the aggregation resource creation request, wherein the aggregation manner indicates a computation process performed on the aggregated resource;
creating the aggregation resource according to the aggregation manner and the identifier of the aggregated resource, wherein an attribute of the aggregation resource comprises the aggregation manner and the identifier of the aggregated resource;
acquiring a current state of the aggregated resource; and
performing information aggregation according to the aggregation manner comprised in the attribute of the aggregation resource to obtain an aggregation result.

12. The method according to claim 11, wherein the aggregation resource creation request comprises the aggregation manner and the identifier of the aggregated resource, and wherein the aggregation manner is a specified computing resource.

13. The method according to claim 11, wherein the aggregation resource creation request comprises an aggregation source expectation and the aggregation manner, wherein the aggregation manner comprises a specified computing resource, and wherein determining the identifier of the aggregated resource comprises:
receiving a resource identifier that meets the aggregation source expectation; and
using the resource identifier as the identifier of the aggregated resource.

14. The method according to claim 11, wherein the aggregation resource creation request comprises an aggregation source expectation and an aggregation result expectation, wherein determining the identifier of the aggregated resource comprises:
receiving a resource identifier that meets the aggregation source expectation; and
using the resource identifier as the identifier of the aggregated resource, and wherein determining the aggregation manner comprises:
receiving a computing resource that meets the aggregation result expectation; and
using the computing resource as the aggregation manner.

15. The method according to claim 14, wherein there are multiple computing resources that meet the aggregation result expectation, and wherein the method further comprises:
determining that the aggregation resource creation request comprises a flag indicating "multiple results allowed";
using the multiple computing resources that meet the aggregation result expectation as the aggregation manner; and
returning an aggregation result of the multiple computing resources when access to the aggregation resource by an application program is received.

16. The method according to claim 14, wherein the computing resource that meets the aggregation result expectation links at least two computing resources.

17. The method according to claim 11, wherein performing information aggregation comprises:

establishing a subscription notification relationship with the aggregated resource, wherein the subscription notification relationship is that a current state of the aggregated resource is acquired when the aggregated resource changes;

performing information aggregation according to the current state of the aggregated resource and the aggregation manner; and storing the aggregation result in an aggregation result resource.

18. The method according to claim 11, wherein performing information aggregation comprises:

monitoring a change of the aggregated resource by polling; and updating the aggregation result resource when a change of the aggregated resource is polled.

19. The method according to claim 11, wherein performing the information aggregation comprises:

performing information aggregation according to the created aggregation resource to obtain an aggregation result after receiving a request message for accessing the aggregation result resource by an application; and returning the aggregation result to the application.

20. The method according to claim 11, further comprising verifying validity to verify whether the determined aggregation resource can be processed in the aggregation manner before creating the aggregation resource.

\* \* \* \* \*